Feb. 16, 1960
C. C. BAUERLEIN
2,925,090
VALVES
Filed June 28, 1956
2 Sheets-Sheet 1
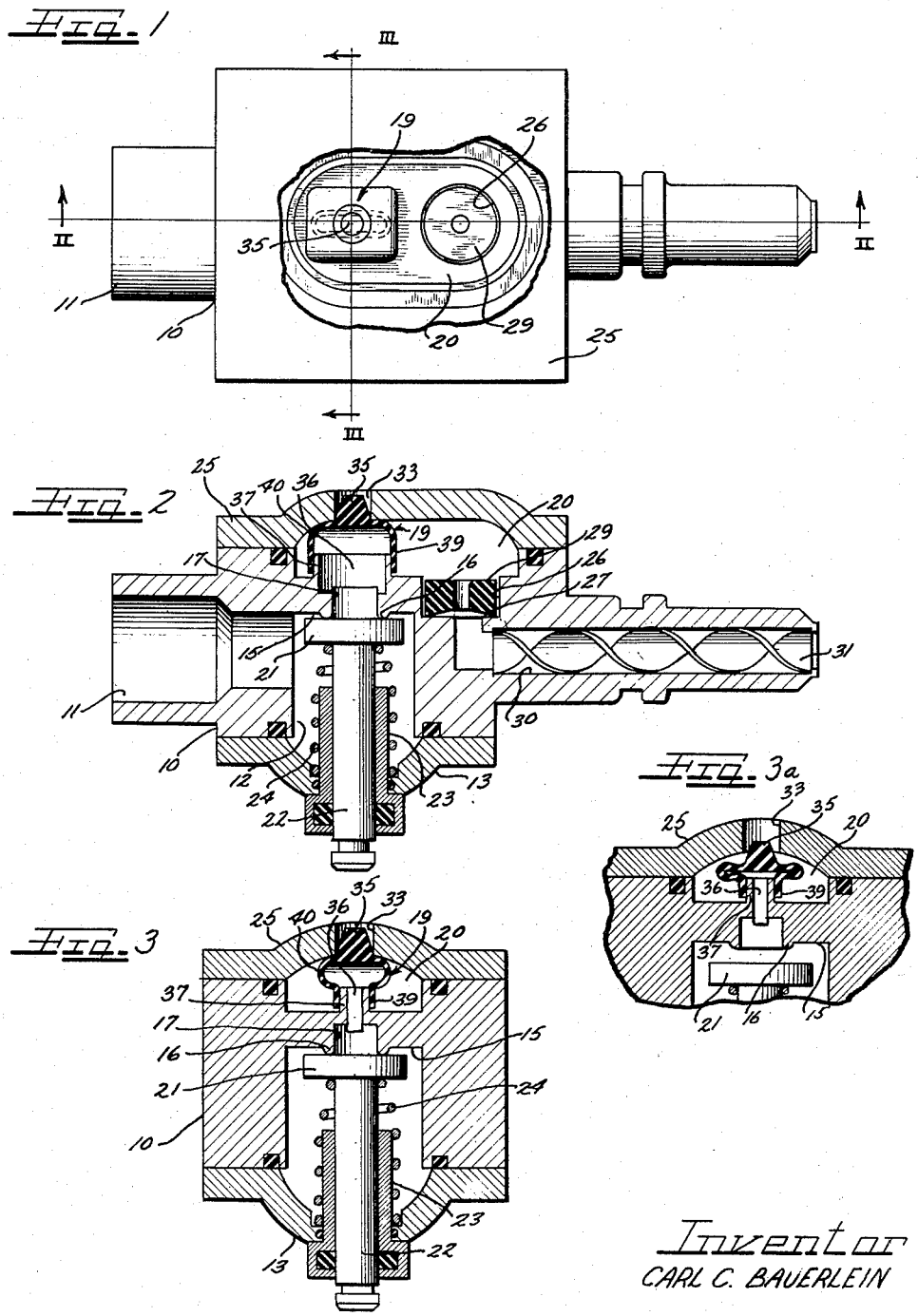
Inventor
CARL C. BAUERLEIN Feb. 16, 1960     C. C. BAUERLEIN     2,925,090
VALVES
Filed June 28, 1956     2 Sheets-Sheet 2
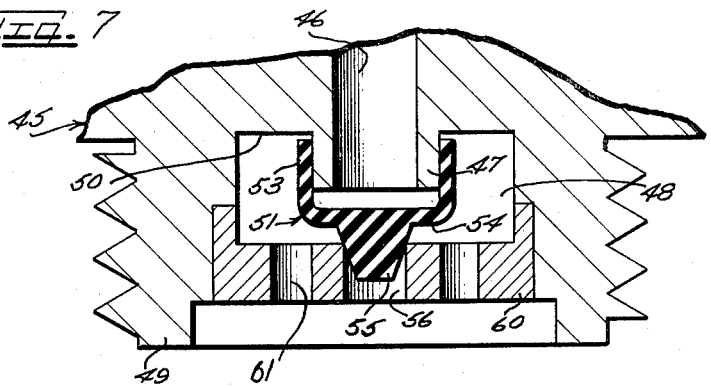
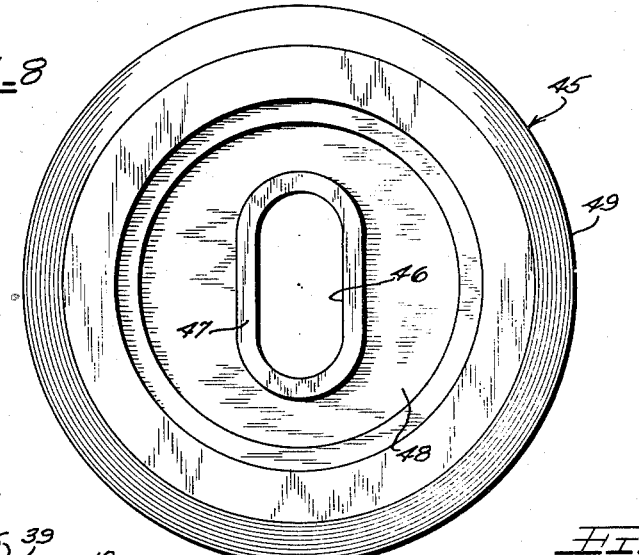
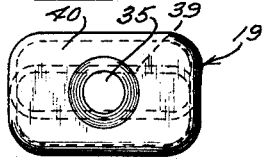
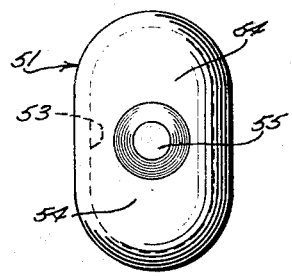
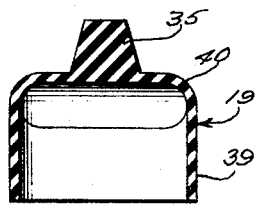
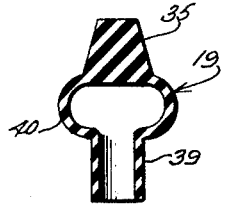
Inventor
CARL C. BAUERLEIN

# United States Patent Office 2,925,090
Patented Feb. 16, 1960

2,925,090

VALVES

Carl C. Bauerlein, Lincolnwood, Ill., assignor to The Dole Valve Company, a corporation of Illinois Application June 28, 1956, Serial No. 594,547

4 Claims. (Cl. 137—218)

This invention relates to improvements in valves and more particularly relates to a novel and simplified form of resilient valve for checking the backflow of fluid into a supply line and preventing vacuum in the supply line from contaminating the supply line.

A principal object of the invention is to provide a simple and improved form of anti-syphoning valve for a water supply line, serving as a check valve to check the backflow of fluid into the line.

Another object of the invention is to provide a novel and efficient vacuum breaker of a simplified construction, for preventing vacuum in a supply line for fluid from contaminating the supply line.

Another object of the invention is to provide an improved form of vacuum breaker in the form of a resilient valve contained within a chamber and serving as a check valve to accommodate fluid to pass through the chamber in one direction and venting the chamber to atmosphere upon the creation of a vacuum in the supply line to the chamber.

A still further object of the invention is to provide a simple and improved form of check valve so arranged as to extend along the outer wall and end of an inlet passage to accommodate the passage of fluid by flexing of the wall of the valve with respect to the passage and to prevent the backflow of fluid into the passage by the pressure of fluid on the valve.

A still further object of the invention is to provide a vacuum breaker including a yieldable valve extending over the end of and about the wall of an inlet passageway into a chamber, readily flexing outwardly with respect to the wall under low pressure to accommodate the flow of fluid through the inlet into the chamber and sealing against the wall and yielding inwardly with respect to the passageway to accommodate the passage of air into the chamber under minimum amounts of vacuum in the inlet passageway.

A still further object of the invention is to provide a combined vacuum breaker and check valve in which the valve is in the form of a cap extending over the end of an inlet passageway within a chamber and stretched to engage the wall of the inlet passageway under slight tension and flexing outwardly with respect to the wall to accommodate the passage of fluid along the wall of the inlet passage into the chamber, but sealing against the wall to prevent the backflow of fluid into the passage, in which the end of the valve has an air vent valve thereon normally retaining the valve to the end of the chamber and blocking the flow of air into the chamber, but flexing inwardly under vacuum to accommodate the flow of air at atmospheric pressure into the chamber upon vacuum conditions in the inlet passageway.

These and other objects of the invention will appear from time to time as the following specification proceeds and with reference to the accompanying drawings wherein:

Figure 1 is a top plan view of a dispenser valve of a type adapted to dispense and proportion concentrates for drinking purposes and having a vacuum breaker valve constructed in accordance with the invention on the supply line from the valve;

Figure 2 is a sectional view taken substantially along line II—II of Figure 1;

Figure 3 is a sectional view taken substantially along line III—III of Figure 1;

Figure 3a is a partial fragmentary sectional view showing the valve operated by vacuum to vent the outlet from the valve body to the atmosphere;

Figure 4 is an enlarged detail top plan view of the check and vacuum breaker valve;

Figure 5 is an enlarged longitudinal sectional view taken through the valve shown in Figure 4;

Figure 6 is a transverse sectional view taken through the valve shown in Figure 4;

Figure 7 is a fragmentary sectional view illustrating a modified form of the invention in which the valve is adapted to serve as a check valve only;

Figure 8 is a fragmentary end view of the outlet passageway shown in Figure 7 with the valve and retainer cage therefor removed; and Figure 9 is a plan view of the check valve shown in Figure 7.

In the embodiment of the invention illustrated in Figures 1 through 6 of the drawings, I have shown for illustrative purposes, a valve assembly particularly adapted to supply water to a proportioning device (not shown) for a dispenser, for proportioning and dispensing juice concentrates and the like. It should here be understood, however, that the valve of my invention is not limited to such use but may be used for any purpose where it is necessary to prevent vacuum in a supply line for fluid from contaminating the supply line.

The valve assembly includes generally a valve body 10 having an inlet 11 leading thereinto into a valve chamber 12 opening at one end to the end of the valve body. The open end of said chamber is closed by an end cap 13 suitably sealed and secured to said valve body. The opposite end of the valve chamber 12 from the end cap 13 terminates into a wall 15 having an integrally formed annular seat 16 thereon, the inner margin of which seat defines a port 17 leading to a resilient vacuum breaker valve 19 in a vacuum breaker chamber 20.

The seat 16 is shown as being engaged by the flat face of a disk valve 21 on the end of a valve stem 22, guided in a sleeve 23 extending through the end cap 13 within the valve chamber 12 and sealed to said end cap. A spring 24 seated on the inner wall of the end cap 13 at one end and on the disk valve 21 at its opposite end is provided to bias said valve into engagement with the seat 16. Suitable operating means (not shown) which may be engaged with the outer end of the stem 22 may be provided to move the valve 21 against the bias of the spring 24 to accommodate the flow of water to the vacuum chamber 20.

The vacuum chamber 20 is closed by an end cap 25 suitably sealed and secured to the opposite wall of the valve body from the end cap 13. The vacuum breaker chamber 20 terminates into a stepped outlet passage 26 having a flat shoulder 27 therein, forming a seat for a resilient annular flow control device 29 arranged to supply a uniform flow rate of water regardless of variations in pressure of the water at the source in a manner well known to those skilled in the art so not herein described further.

The outlet passageway 26 leads to a passageway 30 leading from the valve body 10 in an opposite direction from the inlet passageway 11 and having a spiral 31 therein for creating a turbulence in the water flowing through the passageway 30 to render a proportioning venturi (not shown), which may be in an association therewith, self-priming, as shown and described in my prior application Serial No. 506,577, filed May 6, 1955, and no part of the present invention, so not herein shown or described further.

The end cap 25 is shown as having an air vent 33 leading thereinto in axial alignment with the center of the port 17 and closed by a valve 35 extending from and formed integrally with the vacuum breaker valve 19.

The port 17 communicates with an elongated inlet passageway 36 the inner margin of which is defined by a wall 37 leading into the vacuum chamber 20 and stopping short of the end thereof, as shown in Figures 2 and 3.

The vacuum breaker valve 19 may be made from rubber or from one of the well known substitutes for rubber, such as elastomers and the like and is shown as being in the general form of a nipple having an elongated skirt 39 stretched into engagement with the wall 37 under a slight tension and extending along the outer margin of said wall to maintain a leak-proof connection between the valve 19 and said wall, upon negative pressure conditions in the valve chamber 12. The skirt 39 terminates into a bellows-like cap 40 extending outwardly of the wall 37 and inwardly over the end thereof in spaced relation with respect to the end of said wall, to completely close the inlet 36 to the backflow of fluid therein. The cap is shown in Figure 4 as being generally rectangular in plan and as having the air vent valve 35 formed integrally therewith and projecting outwardly therefrom.

The vacuum breaker valve 19 is held in position on the wall 37 by yieldable engagement of said valve with said wall and by engagement of the bellows-like cap 40 with the inner face of the end closure cap 25.

In operation of the device when the valve 21 is open, fluid under pressure will pass through the port 17 and inlet 36 and exert pressure on the inside of the bellows-like cap 40. The elongated skirt 39 is sufficiently long and flexible to flex outwardly with respect to the wall 37 under relatively low pressure conditions and accommodate the free flow of fluid into the vacuum chamber 20. If, however, a vacuum should occur in the inlet 11, the negative pressure within the valve 19 will effect the sealing of the skirt to the wall 37 to prevent the backflow of fluid into the valve chamber 12 and out the inlet 11. The air vent valve 35 will also be drawn inwardly and out of the vent 33 to vent the chamber 20 to atmosphere. The bellows-like form of the cap 40, thus provides ready flexibility to the valve and enables the cap to be drawn inwardly to withdraw the air vent valve 35 from the vent passageway 33 under relatively low vacuum conditions.

In the modified form of the invention illustrated in Figures 7, 8, and 9, I have shown a valve like the valve 19, which serves solely as a check valve. In this form of the invention, I have shown a fragment of a valve body 45 having an outlet passageway 46 leading from said body and forming an inlet passageway for the check valve. The passageway 46 has a wall 47 extending within the interior of a chamber 48 formed by a hollow threaded boss 49, adapted to be connected to a hose connection or pipe and the like. The passageway 46 is shown in Figure 6 as being in the form of a modified oval in end view, forming a generally oval discharge orifice. The wall 47 is shown in Figure 7 as extending outwardly from an inner end wall 50 of the chamber 48 within the hollow interior of said chamber and boss and forming a generally oval orifice discharging liquid out through said chamber and boss.

A nipple-like check valve 51, similar to the vacuum breaker valve 19, but not having the expanded or bellows-like side walls of the valve 19, is shown as fitting over the wall 47 of the outlet passageway 46 under a slight tension. The check valve 51 is shown as having an elongated skirt 53 stretched into engagement with the outer side of the wall 47 under slight tension and as having a cap 54 extending across the end of the wall 47 and the orifice defined by the inner margin thereof, and closing said orifice under negative and no pressure conditions and under back pressure conditions within the chamber 48.

A lug 55 extends outwardly from the center of the cap within an aperture 56 formed in the central portion of a retainer 60. The retainer 60 is shown as being a flanged flat disk pressed into engagement with the inner wall of the boss 49 and as having a plurality of flow passageways 61 leading therethrough and forming outlet passageways for the check valve.

The check valve 51 operates in the same manner as the vacuum breaker valve 19 and when water is flowing through the outlet 46, the long sides of the skirt 53 will flex outwardly with respect to the wall 47, accommodating the passage of fluid at low pressures through the flow passageways 61 in the retainer 60. When, however, there is a tendency for the water to flow backwardly into the outlet 46, the tension of the skirt 53 on the wall 47 and the pressure of the water on said skirt will seal said skirt to the outer surface of the wall 47 and prevent the backflow of water into the outlet 46.

It will be understood that modifications and variations of the present invention may be effected without departing from the spirit and scope of the novel concepts thereof.

I claim as my invention:

1. In a vacuum breaker, a chamber, an inlet into said chamber, an outlet from said chamber, said inlet including an elongated passageway member extending within said chamber, an end wall defining one margin of said chamber and facing said inlet and having a vent passageway leading therethrough in alignment with said inlet, and a check and vacuum breaker valve having a skirt extending about the outside of said passageway member and engaging said passageway member under tension and having a bellows-like cap extending outwardly from said skirt and across the end of said inlet in spaced relation with respect to said passageway member for closing said inlet and having a valve projecting from said cap and normally engageable with said air vent, said skirt flexing with respect to said passageway member to accommodate the passage of fluid from said inlet to said chamber and sealing the wall of said passageway member upon negative pressure conditions, to accommodate negative pressure in said inlet to withdraw said vent valve from said air vent.

2. Fluid passageway means and a combination vacuum breaker and check valve therefor, comprising a body member having a chamber therein and an inlet passageway to said chamber terminating in a projecting wall portion extending into said chamber and forming the end of said inlet passageway, said body member having an outlet from said chamber and having a vent for said chamber opposite the projecting wall portion forming the end of said inlet passageway, and a resilient combination vacuum breaker and check valve member having a skirt portion mounted under tension on said projecting wall portion in surrounding relationship therewith, a cap portion spaced downstream from said skirt portion and from said projecting wall portion and extending transversely of said inlet passageway, a, connecting portion joining said skirt and cap portions and spanning the space therebetween, said connecting portion being generally U-shaped on a cross section taken axially of said skirt with the bottom of the U spaced transversely outwardly from the ends thereof joined respectively to said skirt and cap portions, and a portion on said cap portion cooperable with said vent.

3. Fluid passageway means and a combination vacuum breaker and check valve therefor, comprising a body member having a chamber therein and an inlet passageway to said chamber terminating in a projecting wall portion extending into said chamber and having an oval shaped outer wall and having an inner wall defining the end of said inlet passageway, said body member having an outlet from said chamber and having a vent for said chamber opposite the projecting wall portion extending into said chamber, and a resilient combination vacuum breaker and check valve member having an oval shaped skirt portion mounted under tension on said projecting wall portion in surrounding relationship with said oval shaped outer wall thereof, a cap portion spaced downstream from said skirt portion and from said projecting wall portion and extending transversely of said inlet passageway, a connecting portion joining said skirt and cap portions and spanning the space therebetween, said connecting portion being generally U-shaped on a cross-section taken axially of said skirt with the bottom of the U spaced transversely outwardly from the ends thereof joined respectively to said skirt and cap portions, and a portion on said cap portion cooperable with said vent.

4. Fluid passageway means and a check valve therefor, comprising a body member, having inlet and outlet ports and a connecting passageway therebetween, said body member having an oval shaped projecting wall portion around said outlet port and forming a check valve inlet, and a resilient check valve member having an oval shaped skirt portion having elongated side walls and mounted under tension on said oval shaped projecting wall portion in surrounding relationship therewith, a cap portion spaced downstream from said skirt portion and from said oval shaped projecting wall portion and extending transversely of said oval shaped projecting wall portion and check valve inlet, and a connecting portion joining said skirt and said cap portion and spanning the space therebetween, said connecting portion being generally U-shaped on a cross-section taken transversely of said oval shaped skirt portion, with the bottom of the U spaced transversely outwardly from the ends thereof joined respectively to said skirt and cap portions.

References Cited in the file of this patent
UNITED STATES PATENTS

| | | |
|---|---|---|
| 2,256,286 | Johnston | Sept. 16, 1941 |
| 2,284,051 | Gilbert | May 26, 1942 |
| 2,412,760 | Svirsky | Dec. 17, 1946 |
| 2,627,278 | Somers | Feb. 3, 1953 |
| 2,651,322 | Hendry | Sept. 8, 1953 |
| 2,707,481 | McPherson | May 3, 1955 |
| 2,764,183 | Gollihon | Sept. 25, 1956 |

FOREIGN PATENTS

| | | |
|---|---|---|
| 48,105 | Germany | July 4, 1889 |
| 1,031,887 | France | Mar. 25, 1953 |